United States Patent
Goetz et al.

(10) Patent No.: US 10,528,330 B2
(45) Date of Patent: *Jan. 7, 2020

(54) SYSTEM AND METHOD FOR SUPPORTING COMPATIBILITY CHECKING FOR LAMBDA EXPRESSION

(71) Applicant: Oracle International Corporation, Redwood Shores, CA (US)

(72) Inventors: Brian Goetz, Wiliston, VT (US); Daniel Smith, Spanish Fork, UT (US); Maurizio Cimadamore, Dublin (IE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/234,533

(22) Filed: Dec. 27, 2018

(65) Prior Publication Data

US 2019/0129699 A1    May 2, 2019

Related U.S. Application Data

(63) Continuation of application No. 15/402,319, filed on Jan. 10, 2017, now Pat. No. 10,209,970, which is a (Continued)

(51) Int. Cl.
*G06F 9/44* (2018.01)
*G06F 9/445* (2018.01)
(Continued)

(52) U.S. Cl.
CPC .............. *G06F 8/437* (2013.01); *G06F 8/425* (2013.01); *G06F 8/43* (2013.01); *G06F 8/315* (2013.01); *G06F 8/41* (2013.01)

(58) Field of Classification Search
CPC . G06F 8/437; G06F 8/425; G06F 8/43; G06F 8/315; G06F 8/41
See application file for complete search history.

(56) References Cited

U.S. PATENT DOCUMENTS

| | | | |
|---|---|---|---|
| 5,748,966 | A | 5/1998 | Sato |
| 6,149,318 | A | 11/2000 | Chase et al. |

(Continued)

OTHER PUBLICATIONS

Yau Chi Hang, A Novel Just-In-Time Compiler on an Embedded Object-Oriented Processor, 2005, pages https://ieeexplore.ieee.org/stamp/stamp.jsp?tp=&arnumber=1562749 (Year: 2005).*

(Continued)

*Primary Examiner* — Mongbao Nguyen
(74) *Attorney, Agent, or Firm* — Invoke

(57) ABSTRACT

A system and method can support compatibility checking in a programming language environment. The programming language environment can check whether a target type associated with an expression in the programming language environment is functional, wherein the target type is functional when it has exactly one method meeting one or more criteria that define that method as relevant in a counting system. Then, the programming language environment can derive a function descriptor from the target type, which is context-dependent. Furthermore, the programming language environment can type-check the expression with the function descriptor associated with the target type.

20 Claims, 3 Drawing Sheets

Related U.S. Application Data continuation of application No. 13/779,536, filed on Feb. 27, 2013, now Pat. No. 9,557,974.

(60) Provisional application No. 61/669,771, filed on Jul. 10, 2012.

(51) Int. Cl.
*G06F 8/41* (2018.01)
*G06F 8/30* (2018.01)

(56) References Cited

U.S. PATENT DOCUMENTS

| | | | |
|---|---|---|---|
| 6,973,646 B1 | 12/2005 | Bordawekar et al. | |
| 7,055,132 B2 | 5/2006 | Bogdan et al. | |
| 7,350,193 B2 | 3/2008 | Belov et al. | |
| 7,620,944 B2 | 11/2009 | Beccario et al. | |
| 7,716,644 B2 | 5/2010 | Horton et al. | |
| 7,761,856 B2 | 7/2010 | Griffin | |
| 7,873,592 B2 | 1/2011 | Meijer et al. | |
| 7,913,239 B2 | 3/2011 | Barton et al. | |
| 7,934,207 B2 | 4/2011 | Gustafsson et al. | |
| 8,060,868 B2 | 11/2011 | Meijer et al. | |
| 8,266,145 B2 | 9/2012 | Leung et al. | |
| 8,397,227 B2 | 3/2013 | Fan et al. | |
| 8,516,458 B2 | 8/2013 | Stewart et al. | |
| 8,555,264 B2* | 10/2013 | Ohrstrom | G06F 9/45504 717/116 |
| 8,656,379 B2* | 2/2014 | Meirowitz | G06F 9/45516 717/153 |
| 8,739,137 B2* | 5/2014 | Siskind | G06F 8/447 717/136 |
| 8,762,942 B2 | 6/2014 | Langworthy et al. | |
| 8,813,049 B2 | 8/2014 | Goetz et al. | |
| 8,990,010 B2 | 3/2015 | Pfeifle et al. | |
| 8,997,070 B2 | 3/2015 | Klemenz et al. | |
| 9,170,787 B2 | 10/2015 | Aharoni et al. | |
| 9,177,017 B2 | 11/2015 | De et al. | |
| 9,195,442 B2 | 11/2015 | Goetz et al. | |
| 9,336,018 B2 | 5/2016 | Zhou et al. | |
| 9,542,168 B2 | 1/2017 | Pamer | |
| 2003/0033596 A1 | 2/2003 | Souloglou et al. | |
| 2004/0083465 A1* | 4/2004 | Zhang | G06F 9/4484 717/143 |
| 2004/0216094 A1 | 10/2004 | Bosworth et al. | |
| 2005/0066319 A1 | 3/2005 | Deline et al. | |
| 2005/0081192 A1 | 4/2005 | Deline et al. | |
| 2005/0229048 A1 | 10/2005 | Da et al. | |
| 2006/0070028 A1 | 3/2006 | Belov et al. | |
| 2006/0130015 A1 | 6/2006 | Griffin | |
| 2006/0190935 A1* | 8/2006 | Kielstra | G06F 9/45516 717/148 |
| 2006/0206876 A1 | 9/2006 | Barton et al. | |
| 2006/0212847 A1 | 9/2006 | Tarditi et al. | |
| 2007/0028223 A1* | 2/2007 | Meijer | G06F 8/427 717/140 |
| 2007/0044083 A1 | 2/2007 | Meijer et al. | |
| 2008/0178140 A1 | 7/2008 | Lin et al. | |
| 2008/0228761 A1 | 9/2008 | Kei et al. | |
| 2008/0262992 A1 | 10/2008 | Meijer et al. | |
| 2008/0320440 A1 | 12/2008 | Meijer et al. | |
| 2009/0144714 A1 | 6/2009 | Fan et al. | |
| 2009/0222799 A1 | 9/2009 | Stewart et al. | |
| 2009/0319991 A1 | 12/2009 | Shneerson et al. | |
| 2009/0328013 A1 | 12/2009 | Aharoni et al. | |
| 2009/0328016 A1 | 12/2009 | Ng et al. | |
| 2010/0066879 A1 | 3/2010 | Tanaka | |
| 2010/0088679 A1 | 4/2010 | Langworthy et al. | |
| 2010/0088686 A1 | 4/2010 | Langworthy et al. | |
| 2010/0180264 A1 | 7/2010 | Aharoni et al. | |
| 2010/0191930 A1* | 7/2010 | Groff | G06F 8/44 711/170 |
| 2010/0192129 A1 | 7/2010 | Langworthy et al. | |
| 2010/0299658 A1* | 11/2010 | Ng | G06F 8/443 717/140 |
| 2011/0167404 A1 | 7/2011 | Liu et al. | |
| 2011/0202906 A1 | 8/2011 | Asao | |
| 2011/0258593 A1 | 10/2011 | Ng et al. | |
| 2011/0314459 A1* | 12/2011 | Husbands | G06F 8/437 717/151 |
| 2012/0005660 A1 | 1/2012 | Goetz et al. | |
| 2012/0079464 A1 | 3/2012 | De et al. | |
| 2012/0079465 A1 | 3/2012 | Harvey | |
| 2012/0137277 A1 | 5/2012 | Varadarajan et al. | |
| 2013/0125101 A1 | 5/2013 | Pamer | |
| 2013/0132070 A1 | 5/2013 | Dayan et al. | |
| 2013/0159981 A1 | 6/2013 | Klemenz et al. | |
| 2014/0019948 A1 | 1/2014 | Goetz et al. | |
| 2014/0068557 A1 | 3/2014 | Vanags et al. | |

OTHER PUBLICATIONS

Mark Michaelis, Delegates and Lambda Expressions in C# 3.0, 2008, pp. 1-15. http://www.informit.com/articles/article.aspx?p=1245158&seqNum=4 (Year: 2008).*

Franck Binard, An Abstraction-Based Genetic Programming System, 2007, pp. 2415-2422. https://dl.acm.org/citation.cfm?id=1274004 (Year: 2007).*

Zeeshan Jafar Hirani, Exploring Lambda Expression in C#, 2008, pp. 1-6. https://www.codeproject.com/Articles/24255/Exploring-Lambda-Expression-in-C (Year: 2008).

Ying Hu, C/C++ Conditional Compilation Analysis Using Symbolic Execution, 2000, pp. 196-206. https://ieeexplore.ieee.org/stamp/stamp.jsp?tp=&arnumber=883045 (Year: 2000).

Willem Van Ketwich, Using LINQ with generics and lambda expression to add wildcard searches to a query, 2010, pp. 1-4.

Saurabh Srivastava, Modular Information Hiding and Type-Safe Linking for C, 2008, pp. 357-375 https://ieeexplore.ieee.org/stamp/stamp.jsp?tp=&arnumber=4497211 (Year: 2008).

Sanaulla, Mohamed, "Lambda Expressions in Java 8", May 21, 2012, Copyright by JavaBeat, 9 pages.

Reinhold, Mark, Project Lambda: Straw-Man Proposal, licensed under a Creative Commons Attribution-Share Alike 3.0 U.S. License, Dec. 2009, 7 pages, retrieved Apr. 2, 2015 from: <http://cr.openjdk.java.net/.about.mr/lambda>.

Peter M. Kelly, Lambda Calculus as a Workflow Model, 2008, pp. 15-22. https://ieeexplore.ieee.org/stamp/stamp.jsp?tp=&arnumber=4539319 (Year: 2008).

Martin Heitmanek, From developers to developers—K#, 2011, pp. 1-11.

Mads Torgersen, Erik Ernst, Christian Plesner Hansen, Peter Von Der Ahe, Filad Bracha, Neal Gafter: "Adding Wildcards to the Java Programming Language" Journal of Object Technology, vol. 3, No. 11, Dec. 2004, Special issue: OOPS track at SAC 2004, Nicosia/Cyprus, pp. 97-116. <http://www.jol.fm/issues/issue_2004_12/article5/>.

Mads Torgersen, Adding Wildcards to the Java Programming Language, 2004, pp. 1-8. http://www.bracha.org/wildcards.pdf.

Laurent Baduel et al., "Programming, Composing, Deploying for the Grid" in Grid Computing: Software Environments and Tools, Springer, 2006, 30 pages.

Jameela Al-Jaroodi et al., "Middleware Infrastructure for Parallel and Distributed Programming Models in Heterogeneous Systems", IEEE Transactions on Parallel and Distributed Systems, vol. 14, No. 11, Nov. 2003, 13 pages.

Hinkel, Frank, Software Engineering, Architecture, "Java 8—Closures, Lambda Expressions Demystified", Nov. 28, 2012, 8 pages, retrieved from: <http://frankhinkel.blogspol.de/2012/11/java-8-closures-lambda-expressions.html>.

Goldman Sachs, GS Collections, Copyright 2011 Goldman Sachs, Version 1.2.0 (Mar. 14, 2012), pp. 1-24.

Goetz, Brian, Translation of Lambda Expressions, Apr. 2012, 10 pages, retrieved Apr. 2, 2015 from: <http://cr.openjdk.java.net/.about.briangoetz/lambda/>.

(56) References Cited

OTHER PUBLICATIONS

Goetz, Brian, State of the Lambda, Version 2, Jul. 6, 2010, 7 pages, retrieved Apr. 2, 2015 from: <http://cr.openjdk.java.net/.about.briangoetz/lambda/>.

Goetz, Brian, State of the Lambda, Oct. 10, 2010, 7 pages, retrieved Apr. 2, 2015 from: <http://cr.openjdk.java.net/.about.briangoetz/lambda/>.

Goetz, Brian, State of the Lambda, Dec. 2011, 4th edition, 10 pages, retrieved Apr. 2, 2015 from: <http://cr.openjdkjava.net/.about.briangoetz/lambda/>.

Goetz, Brian, Interface evolution via virtual extension methods, Fourth draft, Jun. 2011, 12 pages, retrieved Apr. 2, 2015 from: <http://cr.openjdk.java.net/.about.briangoetz/lambda/>.

Goetz, Brian, Interface evolution via "public defender" methods, Third draft, Aug. 2010, 10 pages, retrieved Apr. 2, 2015 from: <http://cr.openjdk.java.net/.about.briangoetz/lambda/>.

Goetz, Brian et al., Featherweight Defenders: A formal model for virtual extension methods in Java, Oracle Corporation, Mar. 27, 2012, 9 pages, retrieved Apr. 2, 2015 from: <http://cr.openjdk.java.net/.about.briangoetz/lambda/>.

Georgios Korfiatis, A Type and Effect System for Implementing Functional Arrays with Destructive Updates, 2011, pp. 879-885. https://ieeexplore.ieee.org/stamp/stamp.jsp?tp=&arnumber=6078196 (Year: 2011).

Francisco Ortin, Design Patterns for Teaching Type Checking in a Compiler Construction Course, 2007, pp. 1-11. https://ieeexplore.ieee.org/stamp/stamp.jsp?tp=&arnumber=4287122 (Year: 2007).

Don Box, LINQ: .NET Language-Integrated Query, 2007, pp. 1-32.

D.A. Lampasi, The Generalized Lambda Distribution for the Expression of Measurement Uncertainty, 2005, pp. 2118-2123. https://ieeexplore.ieee.org/stamp/stamp.jsp?tp=&arnumber=1604548 (Year: 2005).

Brian Goetz, Java theory and practice: Going wild with generics, Part 1, Understanding wildcard capture, 2008, pp. 1-8.

* cited by examiner

SYSTEM AND METHOD FOR SUPPORTING COMPATIBILITY CHECKING FOR LAMBDA EXPRESSION

INCORPORATION BY REFERENCE

Each of the following applications are hereby incorporated by reference: application Ser. No. 15/402,319 filed on Jan. 10, 2017; application Ser. No. 13/779,536 filed on Feb. 27, 2013 and application No. 61/669,771 filed on Jul. 10, 2012. The Applicant hereby rescinds any disclaimer of claim scope in the parent applications or the prosecution history thereof and advises the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent application, which is hereby incorporated by reference in its entirety:

U.S. patent application Ser. No. 13/779,557, filed Feb. 27, 2013, now U.S. Pat. No. 9,195,442 issued Nov. 24, 2015, entitled "SYSTEM AND METHOD FOR COMPILING LAMBDA EXPRESSION IN A PROGRAMMING LANGUAGE ENVIRONMENT".

FIELD OF INVENTION

The present invention is generally related to computer systems and software, and is particularly related to supporting compilation in a programming language environment.

BACKGROUND

An object-oriented programming language, e.g. the Java™ programming language, can dynamically encapsulate program behavior with methods in classes. However, the objects in the object-oriented programming language tend to be relatively heavyweight, due to the instantiation of separately-declared classes wrapping a handful of fields and different methods. Given the increasing relevance of callbacks and other functional-style idioms, it is beneficial that modeling code as data in the object-oriented programming language can be as lightweight as possible.

This is the general area that embodiments of the invention are intended to address.

SUMMARY

Described herein are systems and methods that can support compatibility checking in a programming language environment. The programming language environment can check whether a target type associated with an expression in the programming language environment is functional, wherein the target type is functional when it has exactly one method meeting one or more criteria that define that method as relevant in a counting system. Then, the programming language environment can derive a function descriptor from the target type, which is context-dependent. Furthermore, the programming language environment can type-check the expression with the function descriptor associated with the target type.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Java™ programming language environment as an example for a programming language environment. It will be apparent to those skilled in the art that other types of programming language environments can be used without limitation.

Described herein are systems and methods that can support compatibility checking in a programming language environment.

Figure 1:
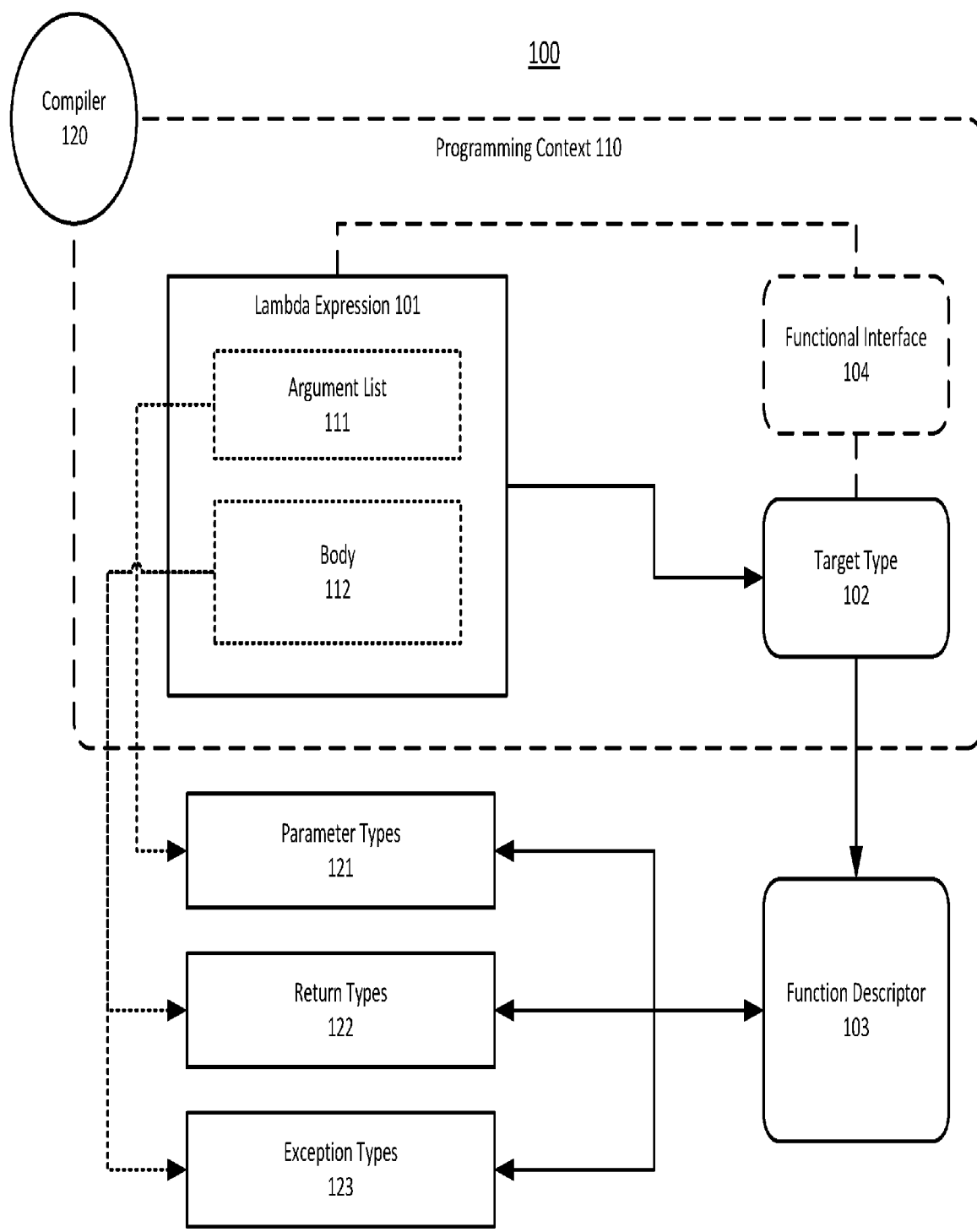
FIG. 1 shows an illustration of supporting compatibility checking in a programming language environment in accordance with various embodiments of the invention.

FIG. 1 shows an illustration of supporting compatibility checking in a programming language environment in accordance with various embodiments of the invention. As shown in FIG. 1, an expression, e.g. a lambda expression 101, can be supported in a programming language environment 100, e.g. using the Java™ programming language.

Lambda expressions 101 can be anonymous methods, which are aimed at addressing the "vertical problem," or bulky syntax, by replacing the machinery of anonymous inner classes with a syntactically lighter-weight mechanism. The general syntax of the lambda expression 101 can include an argument list 111 and a body 112. Additionally, the syntax of the lambda expression 101 can include an arrow token "→."

In the example of the Java™ programming language environment, the argument list 111 can include one or more parameters. The body 112 can be either a single expression or a statement block. In the expression form, the body is simply evaluated and returned. In the block form, the body is evaluated like a method body—a return statement returns control to the caller of the anonymous method. Furthermore, non-local control elements, e.g. break and continue, are illegal at the top level in the lambda expression, but are permitted within loops. If the body produces a result, every control path is required to return something or throw an exception.

The following are examples of lambda expressions.
(int x, int y)→x+y
( )→42
(Siring s)→{System.out.println(s);}

The first lambda expression takes two integer arguments, named x and y, and returns x+y. The second lambda expression takes no arguments and returns the integer 42. The third lambda expression takes a string and prints it to the console, returning nothing.

The lightweight syntax for the lambda expression 101 can be optimized for the common usage in various programming language environments 100. In the example of the Java™ programming language environment, the expression-body form eliminates the need for a return keyword, which could otherwise represent a substantial syntactic overhead relative to the size of the expression.

A compiler 120 in the programming language compiling environment 100 can derive and/or infer various types associated with the lambda expression 101 that can be used for compatibility check. Such types can include one or more parameter types 121, one or more return types 122 from the expression body 112 and one or more exception types 123, or thrown types, from the expression body 112. For example, when the argument list 111 in the lambda expression 101 includes a type of expression, then the compiler 120 can infer the parameter type 121 at runtime.

In accordance with various embodiments of the invention, the lambda expression 101 can have a type that can be deduced at compile time. When the lambda expression 101 appears in a programming context 110, it should be compatible with a type expected in that context, which is referred to as a target type 102. If the lambda expression 101 is not compatible with the target type 102, an error can occur at compile time.

In accordance with various embodiments of the invention, the functional interface 104, or class, can be used for imputing an isomorphism between the set of typed functions and a subset of legal nominal types in an object-oriented programming language. The functional interface 104, or class, which may be considered as "functions in disguise," can have one method meeting one or more criteria that define that method as relevant in a counting system. In the example of the Java™ programming language environment, a functional interface 104 can have only one method excluding the methods that are inherited from the Object class. Additionally, each functional interface 104, or class, can have a function descriptor, which is the method type of the single method.

For example, in the Java™ programming language specification, the following interfaces can be considered as functional.

java.lang.Runnable with a function descriptor ( )→void
    java.util.concurrent.Callable with a function descriptor ( )→V
    java.security.PrivilegedAction with a function descriptor ( )→T
    java.util.Comparator with a function descriptor (T,T)→int
    java.io.FileFilter with a function descriptor (File)→boolean
    java.nio.file.PathMatcher with a function descriptor (Path)→boolean
    java.lang.reflect.invocationHandler with a function descriptor (Object, Method, object[ ])→object
    java.beans.PropertyChangeListener with a function descriptor (PropertyChangeEvent)→void
    java.awt.event.ActionListener with a function descriptor (ChangeEvent)→void
    javax.swing.event.ChangeListener with a function descriptor (Action Event)→void The compiler 120 can structurally (i.e., without instruction from the user) recognize which interfaces/class has this characteristic or is functional, mechanically derive a function descriptor for the interfaces/class, and use that function descriptor for representing lambda expressions in a nominal object-oriented type system.

The lambda expression 101 may only appear in a programming context 110 that has a target type 102. The lambda expression 101 can be context-dependent, which means that the lambda expression 101 can be associated with a target type 102 that is expected to be different in different programming contexts 110.

In accordance with various embodiments of the invention, the compiler 120 can infer a target type 102 of the lambda expression 101 based on the programming contexts 110, since a target type 102 can be expected in the programming context 110, in which the lambda expression appears.

Furthermore, the compiler 120 can check whether the target type 102 is functional based on its structure. The compiler 120 can determine that the target type 102 is functional when the target type 102 represents a single function contract, e.g. implementing a functional interface 104 that has only one abstract method.

Additionally, the compiler 120 can use a process for identifying whether an interface is a functional interface 104 in the programming language environment 100. Such a process can be more complex than simply counting method declarations, since an interface may inherit methods from multiple parents that logically represent the same method, or it may redundantly declare a method that is automatically provided by the class Object, e.g. toString( ).

After determining that the target type 102 is functional, the compiler 120 can derive a function descriptor 103, i.e. method signatures, from the target type 102. The function descriptor 103 of a functional interface 104 can include a method type, type parameters, formal parameter types, return types, and thrown types.

Then, the compiler 120 can check whether the different types 121-123 associated with the lambda expression 101 are consistent with the function descriptor 103 for the target type 102.

In accordance with various embodiments of the invention, a lambda expression 101 can be considered as compatible with a target type 102, T, if the following conditions hold:
    T is a functional interface type,
    The parameters of the lambda expression are compatible with T, e.g. the lambda expression has the same number of parameters as T's method, and those parameters' types are the same or assignment-compatible,
    Each expression returned by the lambda body is compatible with T's method's return type, and
    Each exception thrown by the lambda body is allowed by T's method's throws clause.

Thus, the programming language environment 100 allows programmers to safely express what they mean without excessive syntactic overhead.

For example, by taking advantage of the target typing, the programming language environment 100 allows the lambda expression 101 to avoid repeating parameters types 121 for the lambda expression 101, since the compiler 120 can have knowledge of the parameter types 121 used by the lambda expression 101 based on the target type 102.

For example, in the Java™ programming language environment, there is no need for specifying parameters types for variable s1 and s2, since the Java™ compiler can derive the String parameter types based on the target type, Comparator.

Comparator<String>c=(s1,
s2)→s1.compareToIgnoreCase(s2);

In addition, when there is just one parameter, the type of which can normally be inferred, the parentheses surrounding a single parameter name can be optional.

FileFilter java=f→f.getName( ).endsWith(".java");
button.addActionListener(e→ui.dazzle(e.getModifiers( )));

Furthermore, different programming contexts 110, such as an assignment context, an invocation context, and a casting context, can be supported in the programming language compiling environment 100. Since a different target type 102 is expected to be associated with the lambda expression 101 in a different programming context 110, the type-checking of the lambda expression 101 in a different programming context 110 can be different.

From the perspective of a compiler 120, the lambda expression 101 can be used to create an instance of a target type 102. Also, the compatibility check between return expression of the lambda body and expected return types in the target type 102 can depend on the context.

The following example shows how the interpretation of the body of a lambda expression can vary depending on the context. In this example, a functional interface can be defined as

```
interface Target {
int m( );
}
```

Assuming a variable, longVar, is defined with a long type, the following expression, which is in an assignment context, may be rejected by the compiler 120 for the reason of possible loss of precision.

Target t=( )→longVar;

On the other hand, the following expression, which is in a cast context, may actually be accepted by the compiler 120.

Figure 2:
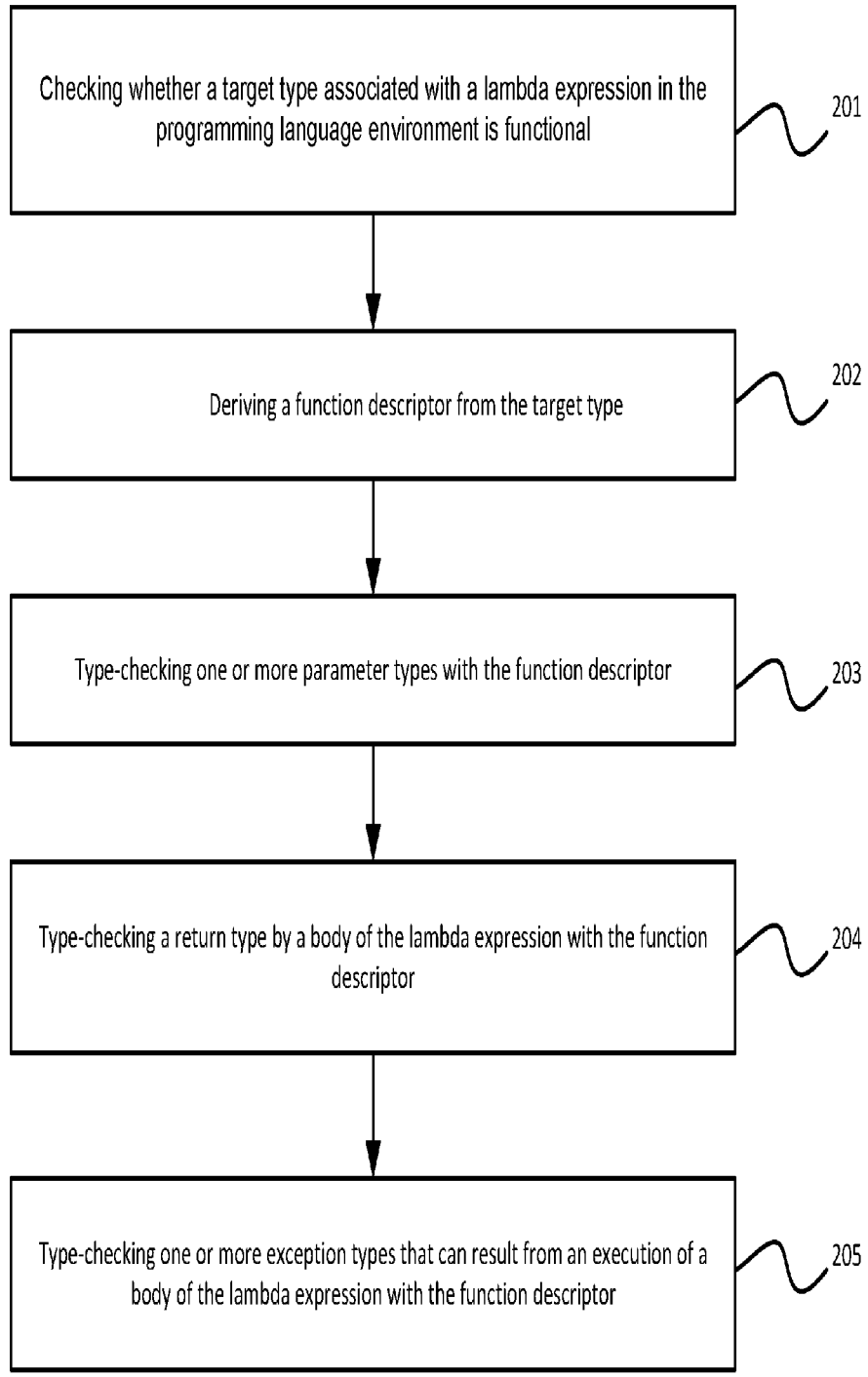
FIG. 2 illustrates an exemplary flow chart for supporting compatibility checking in a programming language environment in accordance with an embodiment of the invention.

Object o=(Target)( )→longVar;

FIG. 2 illustrates an exemplary flow chart for supporting compatibility checking in a programming language environment in accordance with an embodiment of the invention. As shown in FIG. 2, at step 201, a compiler in the programming language compiling environment can check whether a target type associated with a lambda expression in the programming language environment is functional. Then, at step 202, the compiler can derive a function descriptor from the target type. Furthermore, the compiler can type-check the expression with the function descriptor associated with the target type. For example, at step 203, the compiler can type-check one or more parameter types with the function descriptor; at step 204, the compiler can type-check a return type by a body of the lambda expression with the function descriptor; and at step 205, the compiler can type-check one or more exception types that can result from an execution of the body of the lambda expression with the function descriptor.

Appendix A provides further information with respect to supporting compatibility checking in a programming language environment and various aspects of the platform described throughout this disclosure. The information in Appendix A is provided for illustrational purposes and should not be construed to limit all of the embodiments of the invention.

Wildcard Parameterized Type

Figure 3:
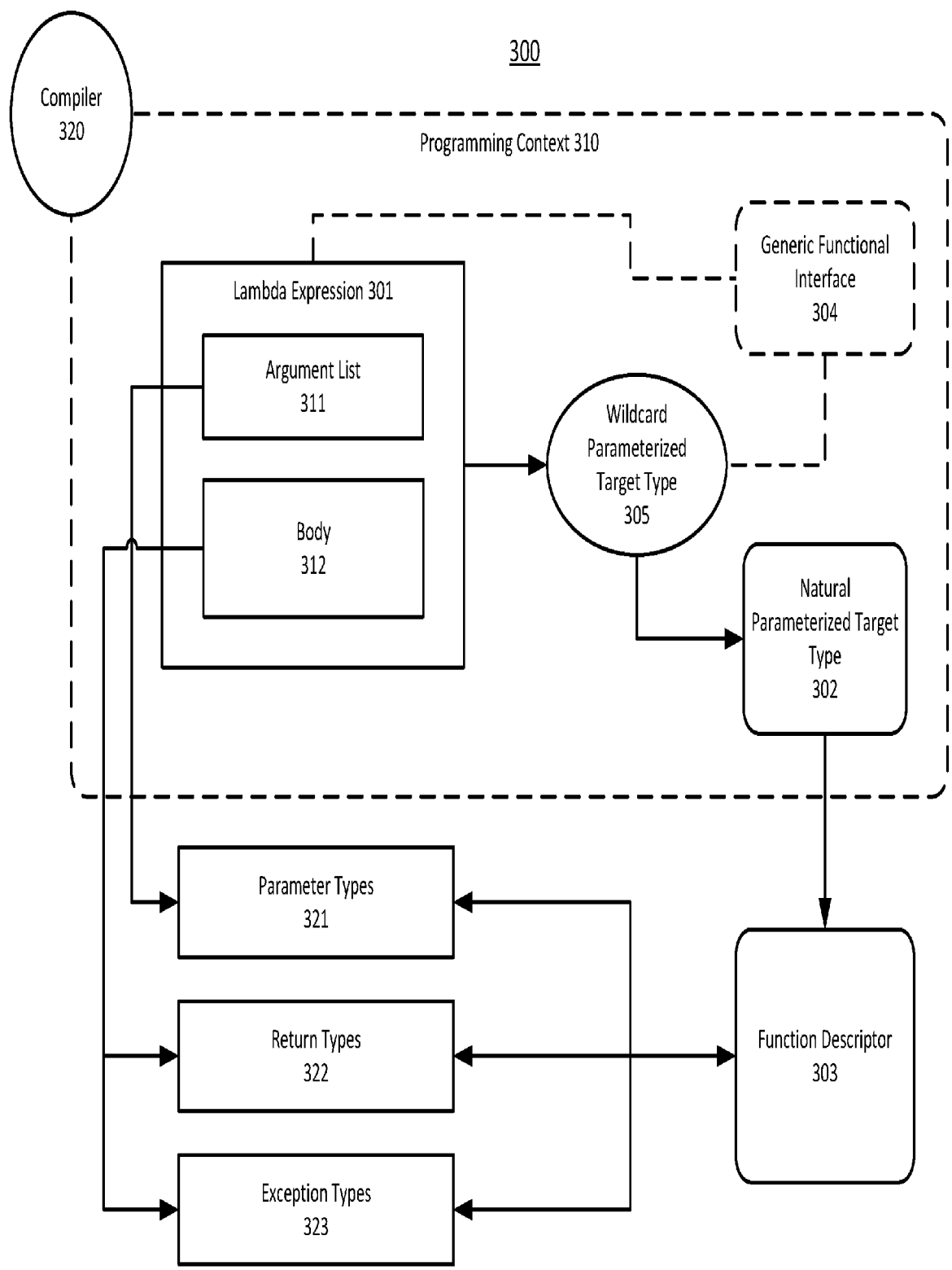
FIG. 3 shows an illustration of checking compatibility for a wildcard parameterized type in a programming language environment, in accordance with various embodiments of the invention.

FIG. 3 shows an illustration of checking compatibility for a wildcard parameterized type in a programming language environment, in accordance with various embodiments of the invention. As shown in FIG. 3, an expression, e.g. a lambda expression 301, can be supported in a programming language environment 300.

The lambda expression 301 can include an argument list 311 and an expression body 312. The lambda expression 301 can involve different types, such as one or more parameter types 321, one or more return types 322 from the expression body 312 and one or more exception types 323 from the expression body 312.

As shown in FIG. 3, the lambda expression 301 can be associated with a generic functional interface 304, e.g. a functional interface that includes one or more wildcards, in a programming context 310. Thus, the target type 305 for the lambda expression 301 can be wildcard parameterized, in which case a natural parameterized target type 302 may need to be inferred in order for the compiler 320 to check for compatibility.

The compiler 320 can instantiate one or more wildcards in the wildcard parameterized target type 305 and using type inference to infer a natural parameterized target type 302. Type inference is a process of reasoning about unknown types, which can be used as a sub-process of the method for checking compatibility of the lambda expressions.

In accordance with various embodiments of the invention, at a high level, type inference include reducing compatibility assertions about expressions or types, called constraint formulas, to a set of bounds on and dependencies between inference variables. For example, given inference variable $\alpha$, it might be determined that the constraint formula String[ ]<: $\alpha$[ ] reduces to the lower bound $\alpha$:>String. As bounds and dependencies are inferred, they are incorporated into a bound set. Ultimately, this bound set is resolved to produce an instantiation for each of the inference variables.

In the example of the Java™ programming language environment, to infer a generic method's applicability, a type inference system asserts that the arguments to the method are compatible with their corresponding formal parameter types, and reduces these constraints to a bound set. The system then checks that there exists a resolution of the resulting bounds. To infer the type of a generic method invocation by a lambda expression, the system re-uses the inferred bound set from method applicability testing, and augments it with the results of asserting the compatibility of the method's return type with its target type. The system can also assert that the exceptions thrown by lambda expression bodies are contained by the throws clauses of their target descriptors.

After reduction, the system resolves the inference variables and uses them as type arguments to determine the invocation type of the method. Type inference is also used to determine a target function descriptor for a lambda expression that is assigned to a wildcard-parameterized functional interface type, and also to determine the validity of an unchecked conversion.

When the return type is an inference variable with only an upper bound, the compiler 320 can infer type arguments from the wildcard bounds, the functional interface parameters' bounds, and the explicit lambda parameter types, if available. A more sophistical approach is to further include constraints on the return types and exception types, in addition to inferring type arguments.

Additionally, other strategies can be used for deriving a target descriptor 303 from a wildcard-parameterized functional interface 304. For example, the compiler 320 can perform capture on the functional interface type 304. This approach may not be helpful for a lambda expression 301, since it is difficult to explicitly mention a capture variable in a lambda expression's parameter types, and write a return expression that is compatible with a return type involving a fresh capture variable.

Alternatively, the compiler 320 can simply replace the wildcard with its bound. This approach can be helpful when the bound is an in-bounds type argument. Furthermore, this approach may need to account for the possibility that the user had in mind a different parameterization.

Appendix B provide further information with respect to deriving a target descriptor from a wildcard-parameterized functional interface in a programming language environment and various aspects of the platform described throughout this disclosure. The information in Appendix B is provided for illustrational purposes and should not be construed to limit all of the embodiments of the invention.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

APPENDIX A

The following illustrates supporting compatibility checking in a Java™ programming language environment, in accordance with various embodiments of the invention. It will be apparent to those skilled in the art that other types of programming language environments can be used without limitation.

A lambda expression has a type if it is compatible with its target type.

A lambda expression is compatible in context c with type T if i) a type for the expression can be derived from T, and ii) the expression is congruent in context c with the function descriptor of this derived type.

The expression's type can be derived from the target type as follows:

If the target type is a wildcard-parameterized functional interface type, a natural parameterized type is inferred. If a natural parameterization can be found, this is the result.

If the target type is a natural functional interface type, the result is the target type itself.

Otherwise, the result is undefined.

A lambda expression is considered as congruent in a context c with a function descriptor if the following are true:
  The number of lambda parameters is the same as the number of parameter types of the descriptor.
  If the lambda parameters have explicitly-declared types, these types are the same as, or compatible with, the parameter types of the descriptor.
  If the lambda body is an expression, then, where the lambda parameters are assumed to have the same types as, or compatible types with, the descriptor parameter types, one of the following is true:
    i. The descriptor's return type is void, and the lambda body is a method invocation expression with a void result,
    ii. The descriptor's return type is a (non-void) type R, and the lambda body is compatible with R both in an assignment context and in context c.
  If the lambda body is a block, then one of the following is true:
    i. The descriptor's return type is void, and the lambda body is void-compatible.
    ii. The descriptor's return type is a (non-void) type R, the lambda body is value-compatible, and, where the lambda parameters are assumed to have the same types as, or compatible types with, the descriptor parameter types, each result expression is compatible with R both in an assignment context and in context c.

A lambda expression may be illegal even if it has a type. For example, it may be compatible with its target type but contain type errors in its body. In addition, where T' is the type of the lambda expression:
  For each checked exception that can result from execution of the body of the lambda expression, a compile-time error occurs unless that exception type or a supertype of that exception type is mentioned in the throws clause of the descriptor of T'.
  It is a compile-time error if any class or interface mentioned by either T' or the descriptor of T' is not accessible from the class in which the lambda expression appears.

APPENDIX B

The following illustrates deriving a target descriptor from a wildcard-parameterized functional interface in a Java™ programming language environment, in accordance with various embodiments of the invention. It will be apparent to those skilled in the art that other types of programming language environments can be used without limitation.

If the target type of a lambda expression (or a method reference is a wildcard-parameterized functional interface type I, a natural parameterization of this interface can be inferred in order to test compatibility. This occurs as follows:
  Where $P_1, \ldots, P_p$ ($p \geq 1$) are the type parameters of the target functional interface, let $\alpha_1, \ldots, \alpha_p$ be inference variables, and let $\theta$ be the substitution $[P_1:=\alpha_1, \ldots, P_p:=\alpha_p]$.

An initial bound set B is constructed from the declared bounds of $P_1, \ldots, P_p$.

Let $S_1, \ldots, S_p$ be the type arguments of the target type. These contribute to an initial constraint formula set; for $1 \leq i \leq p$:
  i. If $S_i$ is a type, the initial constraint formula set includes $S_i = \alpha_i$.
  ii. If $S_i$ is a wildcard of the form ? extends $S_i'$, the initial constraint formula set includes $\alpha_i <: S_i'$.
  iii. If $S_i$ is a wildcard of the form ? super $S_i'$, the initial constraint formula set includes $S_i' <: \alpha_i$.
  iv. Otherwise, $S_i$ is an unbounded wildcard, and no constraint formula involving $S_i$ is included.

If the expression is a lambda expression with declared parameter types $F_1, \ldots, F_n$, the set of initial constraint formulas is further augmented. Let $G_1, \ldots, G_k$ be the parameter types of the function descriptor of the target functional interface. If k=n, then for $1 \leq i \leq n$, the constraint formula set includes $F_i = \vartheta G_i$.

The constraint formula set, with initial bound set B, is reduced to a bound set B'.

The inference variables in B' are resolved.

If B' was successfully resolved, resulting in instantiations $T_1, \ldots, T_p$ for inference variables $\alpha_1, \ldots, \alpha_p$, the resulting type is $I<T_1, \ldots, T_p>$. If B' could not be successfully resolved, there is no result.

What is claimed is:

1. A method, comprising:
identifying a first instruction, in a set of code, that includes a particular expression and associates the particular expression with a first target type in a first context;
wherein the particular expression includes (a) a list of one or more parameters and (b) a body including a single expression or a statement block;
performing, during a compilation of the set of code, a first compatibility check on the particular expression and the first target type, wherein performing the first compatibility check on the particular expression and the first target type comprises:
  determining that the first target type is a functional interface, wherein only a single method of a set of one or more methods contained in the functional interface is not inherited from a particular class;
  determining a function descriptor associated with the first target type based on at least one of: a method type of the single method, a parameter type of the single method, a return type of the single method, and an exception type of the single method;
  type-checking the particular expression with the function descriptor associated with the first target type to determine compatibility between the particular expression and the first target type;
determining, during the compilation of the set of code, that the particular expression is compatible with the first target type;
identifying a second instruction, in the set of code, that includes the particular expression and associates the particular expression with a second target type in a second context;
wherein the first target type and the second target type are different;
performing, during the compilation of the set of code, a second compatibility check on the particular expression and the second target type;
determining, during the compilation of the set of code, that the particular expression is compatible with the second target type;
wherein the method is performed by at least one device including a hardware processor.

2. A system, comprising:
at least one device including a hardware processor; and
the system being configured to perform operations comprising:
identifying a first instruction, in a set of code, that includes a particular expression and associates the particular expression with a first target type in a first context;
wherein the particular expression includes (a) a list of one or more parameters and (b) a body including a single expression or a statement block;
performing, during a compilation of the set of code, a first compatibility check on the particular expression and the first target type, wherein performing the first compatibility check on the particular expression and the first target type comprises:
  determining that the first target type is a functional interface, wherein only a single method of a set of one or more methods contained in the functional interface is not inherited from a particular class;
  determining a function descriptor associated with the first target type based on at least one of: a method type of the single method, a parameter type of the single method, a return type of the single method, and an exception type of the single method;
  type-checking the particular expression with the function descriptor associated with the first target type to determine compatibility between the particular expression and the first target type;
determining, during the compilation of the set of code, that the particular expression is compatible with the first target type;
identifying a second instruction, in the set of code, that includes the particular expression and associates the particular expression with a second target type in a second context;
wherein the first target type and the second target type are different;
performing, during the compilation of the set of code, a second compatibility check on the particular expression and the second target type;
determining, during the compilation of the set of code, that the particular expression is compatible with the second target type.

3. The system of claim 2, wherein:
type-checking the particular expression with the function descriptor associated with the first target type to determine compatibility between the particular expression and the first target type comprises: type-checking a parameter, of the list of parameters, indicated by the particular expression with the parameter type of the single method associated with the first target type.

4. The system of claim 2, wherein:
type-checking the particular expression with the function descriptor associated with the first target type to determine compatibility between the particular expression and the first target type comprises: type-checking a particular return type associated with the body indicated by the particular expression with the return type of the single method associated with the first target type.

5. The system of claim 2, wherein:
type-checking the particular expression with the function descriptor associated with the first target type to determine compatibility between the particular expression and the first target type comprises: type-checking a particular exception type associated with the body indicated by the particular expression with the exception type of the single method associated with the first target type.

6. The system of claim 2, wherein:
the first instruction assigns the particular expression to an object of the first target type.

7. The system of claim 2, wherein:
the first instruction specifies the particular expression as a value for a parameter inputted to a particular method; and
a parameter type of the parameter inputted to the particular method is the first target type.

8. The system of claim 2, wherein:
the first instruction casts the particular expression as the first target type.

9. The system of claim 2, wherein:
the first context comprises an assignment context; and
the second context comprises at least one of: an invocation context and a casting context.

10. The system of claim 2, wherein:
type-checking the particular expression with the function descriptor associated with the first target type to determine compatibility between the particular expression and the first target type comprises: determining whether a particular type of a parameter, of the list of parameters, indicated by the particular expression is same as or assignment-compatible with the parameter type of the single method associated with the first target type.

11. One or more non-transitory machine-readable media storing instructions which, when executed by one or more processors, cause:
identifying a first instruction, in a set of code, that includes a particular expression and associates the particular expression with a first target type in a first context;
wherein the particular expression includes (a) a list of one or more parameters and (b) a body including a single expression or a statement block;
performing, during a compilation of the set of code, a first compatibility check on the particular expression and the first target type, wherein performing the first compatibility check on the particular expression and the first target type comprises:
determining that the first target type is a functional interface, wherein only a single method of a set of one or more methods contained in the functional interface is not inherited from a particular class;
determining a function descriptor associated with the first target type based on at least one of: a method type of the single method, a parameter type of the single method, a return type of the single method, and an exception type of the single method;
type-checking the particular expression with the function descriptor associated with the first target type to determine compatibility between the particular expression and the first target type;
determining, during the compilation of the set of code, that the particular expression is compatible with the first target type;
identifying a second instruction, in the set of code, that includes the particular expression and associates the particular expression with a second target type in a second context;
wherein the first target type and the second target type are different;
performing, during the compilation of the set of code, a second compatibility check on the particular expression and the second target type;
determining, during the compilation of the set of code, that the particular expression is compatible with the second target type.

12. The one or more non-transitory machine-readable media of claim 1, wherein:
type-checking the particular expression with the function descriptor associated with the first target type to determine compatibility between the particular expression and the first target type comprises: type-checking a parameter, of the list of parameters, indicated by the particular expression with the parameter type of the single method associated with the first target type.

13. The one or more non-transitory machine-readable media of claim 11, wherein:
type-checking the particular expression with the function descriptor associated with the first target type to determine compatibility between the particular expression and the first target type comprises: type-checking a particular return type associated with the body indicated by the particular expression with the return type of the single method associated with the first target type.

14. The one or more non-transitory machine-readable media of claim 11, wherein:
type-checking the particular expression with the function descriptor associated with the first target type to determine compatibility between the particular expression and the first target type comprises: type-checking a particular exception type associated with the body indicated by the particular expression with the exception type of the single method associated with the first target type.

15. The one or more non-transitory machine-readable media of claim 11, wherein:
the first instruction assigns the particular expression to an object of the first target type.

16. The one or more non-transitory machine-readable media of claim 11, wherein:
the first instruction specifies the particular expression as a value for a parameter inputted to a particular method; and
a parameter type of the parameter inputted to the particular method is the first target type.

17. The one or more non-transitory machine-readable media of claim 11, wherein:
the first instruction casts the particular expression as the first target type.

18. The one or more non-transitory machine-readable media of claim 11, wherein:
the first context comprises an assignment context; and
the second context comprises at least one of: an invocation context and a casting context.

19. The one or more non-transitory machine-readable media of claim 11, wherein performing the first compatibility check on the particular expression and the first target type further comprises:

inferring a natural parameterized type from a wildcard-parameterized functional interface type associated with the first target type; and type-checking the particular expression with the natural parameterized type.

20. The one or more non-transitory machine-readable media of claim 11, wherein:

type-checking the particular expression with the function descriptor associated with the first target type to determine compatibility between the particular expression and the first target type comprises: determining whether a particular type of a parameter, of the list of parameters, indicated by the particular expression is same as or assignment-compatible with the parameter type of the single method associated with the first target type.

* * * * *

UNITED STATES PATENT AND TRADEMARK OFFICE
CERTIFICATE OF CORRECTION

PATENT NO. : 10,528,330 B2  
APPLICATION NO. : 16/234533  
DATED : January 7, 2020  
INVENTOR(S) : Goetz et al.

Page 1 of 1

It is certified that error appears in the above-identified patent and that said Letters Patent is hereby corrected as shown below:

On the Title Page

Item (72) Inventors, Line 1, delete "Wiliston" and insert -- Williston --, therefor.

In the Specification

In Column 2, Line 67, delete "(Siring s)" and insert -- (String s) --, therefor.

In Column 2, Line 67, delete "{System.out.println(s);}" and insert -- {System.out.printIn(s);} --, therefor.

In Column 3, Line 58, delete "javalang.reflect.invocationHandler" and insert -- java.lang.reflect.InvocationHandler --, therefor.

In Column 3, Line 59, delete "object[ ])" and insert -- Object[ ]) --, therefor.

In Column 3, Line 65, delete "(Action Event)" and insert -- (ActionEvent) --, therefor.

In Column 7, Line 37, delete "data" and insert -- data. --, therefor.

In Column 8, Line 22, delete "result," and insert -- result. --, therefor.

In the Claims

In Column 12, Line 14, in Claim 12, delete "Claim 1," and insert -- Claim 11, --, therefor.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*